(12) United States Patent
Hong

(10) Patent No.: US 11,005,944 B2
(45) Date of Patent: May 11, 2021

(54) METHOD FOR BINDING NB-IOT DEVICE, AND INTERNET OF THINGS CONTROL SYSTEM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/726,874

(22) Filed: Dec. 25, 2019

(65) Prior Publication Data

US 2020/0137168 A1 Apr. 30, 2020

Related U.S. Application Data

(63) Continuation of application No. PCT/CN2017/094292, filed on Jul. 25, 2017.

(51) Int. Cl.
*H04L 1/00* (2006.01)
*G06F 3/12* (2006.01)
*H04L 29/08* (2006.01)

(52) U.S. Cl.
CPC .......... *H04L 67/125* (2013.01); *G06F 3/1219* (2013.01); *G06F 3/1239* (2013.01); *H04L 67/1097* (2013.01)

(58) Field of Classification Search
CPC ... H04L 67/125; H04L 67/10; H04L 67/1097; G06F 3/1219; G06F 3/1239
(Continued)

(56) References Cited

U.S. PATENT DOCUMENTS

2012/0127011 A1 5/2012 Lee et al.
2017/0243475 A1* 8/2017 Zhang .................. H04W 4/80
2020/0163155 A1* 5/2020 Lee ...................... H04L 5/0053

FOREIGN PATENT DOCUMENTS

CN 103763392 A 4/2014
CN 104601714 A 5/2015
(Continued)

OTHER PUBLICATIONS

International Search Report in the international application No. PCT/CN2017/094292, dated Oct. 27, 2017.
(Continued)

*Primary Examiner* — Ibrahim Siddo
(74) *Attorney, Agent, or Firm* — Syncoda LLC; Feng Ma

(57) ABSTRACT

A method for binding an NB-IoT device, includes transmitting, by the NB-IoT device, a first binding message carrying device information and a first device identification of the NB-IoT device to a cloud management platform upon detecting a first operation instruction; storing, by the cloud management platform, the device information and the first device identification; obtaining, by a management terminal, the first device identification of the NB-IoT device to be bound upon detecting a second operation instruction, and transmitting a second binding message carrying the first device identification to the cloud management platform; obtaining, by the cloud management platform, the device information corresponding to the first device identification by locally searching according to the first device identification carried in the second binding message, and transmitting the device information to the management terminal; and storing, by the management terminal, the device information as device information bound to the NB-IoT device.

19 Claims, 4 Drawing Sheets

(58) Field of Classification Search
USPC .......................................................... 358/1.15
See application file for complete search history.

(56) References Cited

FOREIGN PATENT DOCUMENTS

| | | | |
|---|---|---|---|
| CN | 104935583 | A | 9/2015 |
| CN | 104994073 | A | 10/2015 |
| CN | 105812491 | A | 7/2016 |
| CN | 105871821 | A | 8/2016 |
| KR | 101688813 | B1 | 12/2016 |

OTHER PUBLICATIONS

CN First Office Action in Application No. 201780000683.2, dated Jul. 7, 2020.
CN Second Office Action in Application No. 201780000683.2, dated Sep. 3, 2020.

* cited by examiner

METHOD FOR BINDING NB-IOT DEVICE, AND INTERNET OF THINGS CONTROL SYSTEM

CROSS-REFERENCE TO RELATED APPLICATION

This application is a continuation of International Application No. PCT/CN2017/094292, filed on Jul. 25, 2017, the disclosure of which is hereby incorporated by reference in its entirety.

BACKGROUND

The 5th-Generation (5G) technologies not only can include communications between base stations and mobile phones, but also can penetrate technologies of Internet of Things (IoT). In the field of the IoT, household appliances, e.g., computers, tablet PCs, mobile phones, air conditioners, electric cookers, refrigerators, televisions, washing machines, and sensors, etc. are capable of communicating each other along the Internet through the 5G technologies.

SUMMARY

The present disclosure relates generally to the field of communication technologies, and more specifically to a method for binding an NB-IoT device and an Internet of Things control system.

In a first aspect, there is provided a method for binding a Narrow Band Internet of Things (NB-IoT) device, the method is applied on an Internet of things control system having an NB-IoT device, a cloud management platform and a management terminal of a core network, and the method includes steps of transmitting, by the NB-IoT device, a first binding message to the cloud management platform upon detecting a first operation instruction, wherein the first binding message carries device information and a first device identification of the NB-IoT device; storing, by the cloud management platform, the device information and the first device identification; obtaining, by the management terminal, the first device identification of the NB-IoT device to be bound upon detecting a second operation instruction, and transmitting, by the management terminal, a second binding message to the cloud management platform, wherein the second binding information carries the first device identification; obtaining, by the cloud management platform, the device information corresponding to the first device identification by locally searching according to the first device identification carried in the second binding message, and transmitting, by the cloud management platform, the device information to the management terminal; and storing, by the management terminal, the device information as device information bound to the NB-IoT device.

In a second aspect, there is provided an Internet of Things control system, the system includes an NB-IoT device, a cloud management platform and a management terminal of a core network; the NB-IoT device is configured to transmit a first binding message to the cloud management platform upon detecting a first operation instruction, wherein the first binding message carries device information and a first device identification of the NB-IoT device; the cloud management platform is configured to store the device information and the first device identification; the management terminal is configured to obtain the first device identification of the NB-IoT device to be bound upon detecting a second operation instruction, and transmit a second binding message to the cloud management platform, wherein the second binding message carries the first device identification; the cloud management platform is configured to obtain the device information corresponding to the first device identification by locally searching according to the first device identification carried in the second binding message, and transmit the device information to the management terminal; and the management terminal is configured to store the device information as device information bound to the NB-IoT device.

In a third aspect, there is provided a non-transitory computer-readable storage medium storing computer-readable instructions, the instructions, when executed by a processor in a terminal, performing processes including: obtaining, by the terminal, a first device identification of an NB-IoT device to be bound upon detecting a second operation instruction, and transmitting, by the terminal, a second binding message to a cloud management platform, wherein the second binding information carries the first device identification; and storing, by the terminal, device information, transmitted by the cloud management platform, as device information bound to the NB-IoT device.

It is to be understood that the above general descriptions and the following detailed descriptions bare only exemplary and explanatory and not intended to limit the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Figure 1:
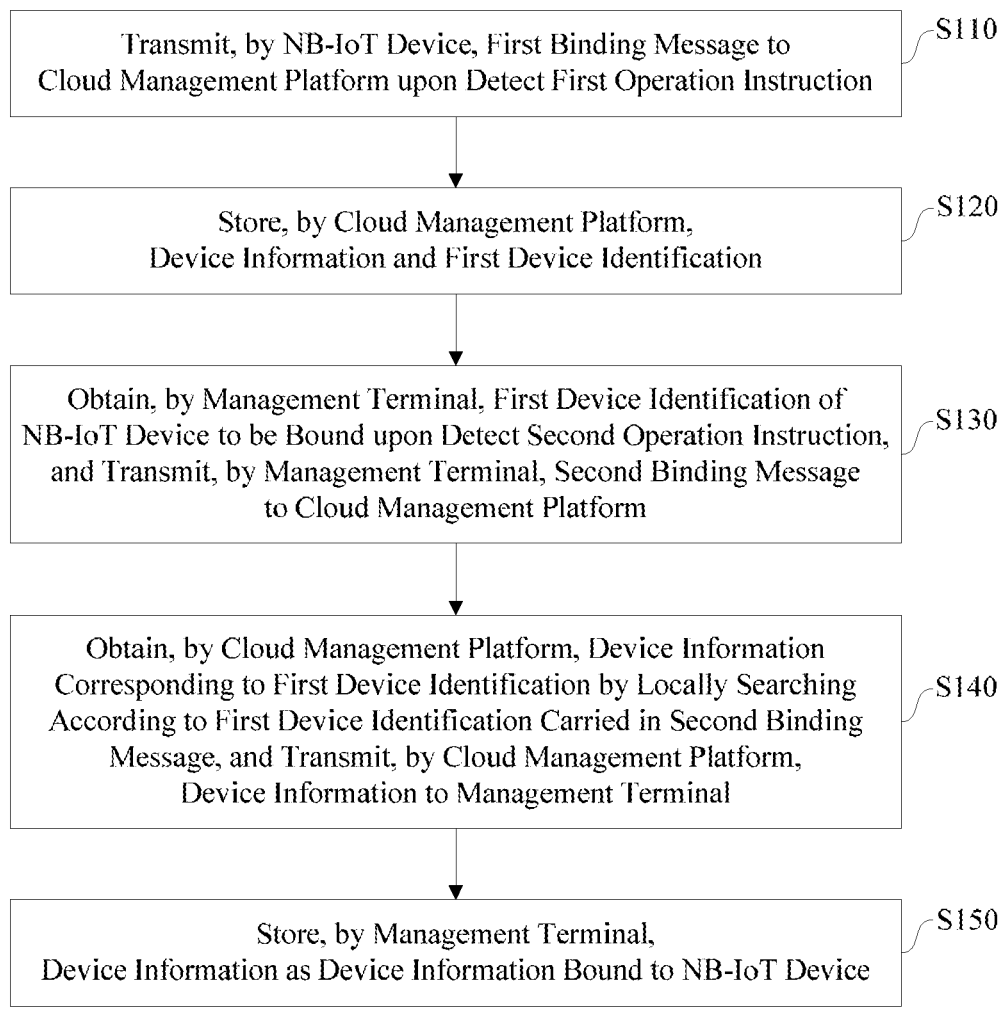
FIG. 1 is a flowchart of a method for binding a Narrow Band Internet of Things (NB-IoT) device in some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In the applications of the Internet of Things, the low-end smart devices, e.g., the air conditioners, the electric cookers, the refrigerators, the televisions, the washing machines and the sensors, etc. can be managed by the high-end smart devices, e.g., the mobile phones. The low-end smart devices can be bound with a management module of a high-end smart device, before the high-end smart device starts to manage the low-end smart devices. Therefore, the high-end smart devices are then able to recognize and manage the recognized low-end smart devices.

A low-end smart device can be bound to a high-level smart device through Wireless-Fidelity (Wi-Fi). For example, a low-end smart device is bound to a high-end smart device located in the same Wi-Fi environment. However, low-end smart devices not utilizing Wi-Fi technologies are unable to be bound with a high-end smart device through the Wi-Fi technologies.

In order to achieve the target of "Internet of Things," it may be needed to utilize 5G technology to establish a large number of connections of things. Narrow Band Internet of Things (NB-IoT) technologies can be established in the mobile cellular network and configured to support data connections of low-end smart devices in the mobile cellular network of the Wide Area Network (WAN). High-end smart devices such as mobile phones typically require large bandwidth to transmit significant amount of data during web browsing and video streaming. However, in NB-IoT, the communications of the low-end smart devices are just simple communications including key interacting information transmissions. Thus, in general, the implementation of Internet of Things in NB-IoT only requires a bandwidth of 180 kHZ.

In some embodiments of the present disclosure, there is provided a method for binding a Narrow Band Internet of Things (NB-IoT) device. The method is applied on an Internet of Things control system having an NB-IoT device, a cloud management platform and a management terminal of a core network. An NB-IoT chip is equipped with the NB-IoT device and the NB-IoT is connected to the network by the NB-IoT chip. The cloud management platform is a device of the core network, e.g. a server having processing capabilities used to manage devices connected to the cloud management platform.

The management terminal includes a mobile phone, and a tablet PC, etc. It should be noted that the NB-IoT device is not able to directly communicate with the management terminal but is able to communicate with the management terminal through the cloud management platform. The communications between the NB-IoT device, the management terminal and the cloud management platform are achieved by a base station.

During communication process, the base station transfers information without applying any information processing. The description of embodiments of the present disclosure only illustrates the interactions between the NB-IoT device, the cloud management platform and the management terminal of the core network in detail without considering functions of the base station.

The management terminal includes a transceiver, a processor, a memory, etc. The transceiver is a component used to communicate with the cloud management platform, for example, transmitting a second binding message to the cloud management platform. The transceiver includes radio-frequency circuits, Bluetooth components, Wireless-Fidelity (Wi-Fi) components, antennas, matching circuits, modems, etc. The processor includes a Central Processing Unit (CPU), etc., which is used to obtain a first device identification of the NB-IoT device for binding. The memory includes a Random Access Memory (RAM), a flash memory (Flash), etc., which is used to store received data, required data for processing, data generated during processing, etc., e.g., device information for binding the NB-IoT device, etc.

The terminal further includes input components, display components, audio output components, etc. The input components can include a touch screen, a keyboard, a mouse, etc. The audio output components include speakers, and headphones, etc.

It should be noted that when a new NB-IoT device is purchased, the method for binding the NB-IoT device disclosed by the present disclosure is implemented to manage the NB-IoT device through the management terminal.

FIG. 1 is a flowchart of a method for binding an NB-IoT device in some embodiments of the present disclosure. Referring to FIG. 1, the method includes following steps.

In step S110, the NB-IoT device transmits a first binding message to the cloud management platform upon detecting a first operation instruction, wherein the first binding message carries device information and a first device identification of the NB-IoT device.

The first operation instruction is generated by the NB-IoT device upon detecting a predefined operation performed by a user. The predefined operation includes pressing a power button and a sleep button at the same time, pressing and holding the power button for 5 seconds, pressing the power button for 3 times in sequence, etc., which means that the NB-IoT device is bound to a management terminal upon detecting a predefined operation performed by the user. A first binding message is generated according to the first operation instruction. The NB-IoT device transmits the pre-stored device information and first device identification to the cloud management platform. The NB-IoT device communicates with the cloud management platform via NB-IoT protocol.

The NB-IoT device is directly registered in the NB-IoT network of a network operator where the NB-IoT device is located, when the NB-IoT device is powered on.

In some embodiments, the device information includes but is not limited to any one or more of the followings: a device type, a device name, and an operating parameter.

For example, the NB-IoT device is a printer, and the device type of the NB-IoT device is "LaserJet." The name of the printer is "HP LaserJet Professional M1213nf MFP." The operating parameter of the printer is "Ink Shortage (lack of ink)" which indicates ink shortage in the printer. The device identification of the printer is "CNJ8F7F46S."

In step S120, the cloud management platform stores the device information and the first device identification in a corresponding way.

In this embodiment, the cloud management platform receives and stores the device information. The first device identification is transmitted by the NB-IoT device. For example, the cloud management platform creates a device information list which is stored in the memory. The data on the list includes a header and a tail. The header corresponds to the tail. Therefore, content of the data is obtained when obtaining the header of the data on the device information list.

In this embodiment, the first device identification is stored in the header of the data and the device information is stored in the tail of the data. When the cloud management platform receives device information and a device identification transmitted by a new NB-IoT device, a second data is then created. The device information and the device identification are stored by the above methods. Therefore, a device information list including pieces of data is obtained. In other embodiments, the device information and the first device identification may be stored in a corresponding way by other methods, which are not illustrated in the present disclosure.

In step S130, the management terminal obtains the first device identification of the NB-IoT device which is bound upon detecting a second operation instruction. The management terminal transmits a second binding message to the cloud management platform, and the second binding information carries the first device identification.

In some embodiments, the step of the management terminal obtaining the first device identification of the NB-IoT device for being bound includes: obtaining the first device identification, inputted by the user, of the NB-IoT device for being bound.

The second operation instruction is generated according to a predefined operation inputted by the user in the management terminal. In some embodiments, an application for managing the NB-IoT device is launched by the user in the management terminal, and the first device identification of the NB-IoT device for being bound is inputted, by the user, into a device identification inputting window of a device binding operation interface of the application. The management terminal then obtains the first device identification, e.g., the "CNJ8F7F46S," inputted by the user, of the NB-IoT device for being bound.

Therefore, the management terminal transmits the second binding information carrying the first device identification, e.g., the "CNJ8F7F46S" to the cloud management platform. It should be noted that since the management terminal and the NB-IoT device may respectively use different communication modes, the management terminal and the NB-IoT device are then not able to be bound each other. The management terminal and the NB-IoT device are not able to directly communicate each other. Therefore, the management terminal and the NB-IoT device are able to communicate through the cloud management platform.

In step S140, the cloud management platform obtains device information corresponding to the first device identification by locally searching according to the first device identification carried in the second binding message, and transmits the device information to the management terminal.

In this embodiment, as described above, a device information list is created in the cloud management platform, and the list includes pieces of pre-stored data including corresponding relations of first device identifications and device information.

The cloud management platform extracts a first device identification, e.g., the "CNJ8F7F46S" carried in the second binding message, after the second binding message is received. The cloud management platform then searches the device information list for the "CNJ8F7F46S" to obtain the corresponding device information such as the device type "LaserJet," the device name "HP LaserJet Professional M1213nf MFP" and the operating parameter "Ink Shortage." The cloud management platform transmits the device information to the management terminal after the device information is obtained.

In step S150, the management terminal stores the device information as the device information of the bound NB-IoT device.

In this embodiment, the management terminal receives the device information transmitted by the cloud management platform, and stores the device information as the device information of the bound NB-IoT device, such that the management terminal can use the device information to achieve the purpose of managing the NB-IoT device, during subsequent management of the NB-IoT device.

In some embodiments, the management terminal manages the NB-IoT device by following manners. The method, disclosed by the present disclosure, further includes: the management terminal determines control parameters according to the device information, and transmits a control request to the cloud management platform, wherein the control request carries the control parameters and the first device identification; and the cloud management platform transmits the control request to the NB-IoT device corresponding to the first device identification.

The control parameter may be determined according to an operating parameter of the device information. For example, when the management terminal receives an operating parameter "Operating Parameter-Ink Shortage" of an NB-IoT device, e.g., a printer, the management terminal may determine, according to the operating parameter, that the printer is in an ink lack state. The management terminal then determines a control parameter "Stop Printing" when another operating parameter of the printer, representing the printer working under printing state, is determined.

The printed image is unclear or missing if the printer performs the print job under the ink lack state. The unclear printed image will result in waste of paper and requires being reprinted with new paper. The missing printed image results in waste of power consumption by performing the print job of the printer. Therefore, when the management terminal detects the printer working under the ink lack state, the management terminal terminates the printing work of the printer according to pre-defined determining rules.

In the above example, the management terminal transmits a control request carrying the control parameter "Stop Printing" and the device identification "CNJ8F7F46S" of the printer to the cloud management platform, after the management terminal determines the control parameter "Stop Printing."

After the control request is received, the cloud management platform extracts the device identification "CNJ8F7F46S" of the printer from the control request, made by the management terminal, to determine the bound NB-IoT device that is in pending control state. When the cloud management platform determines that the control request is for controlling the printer with the device identification "CNJ8F7F46S," the control request is then transmitted to the printer with the device identification "CNJ8F7F46S."

In some embodiments, the NB-IoT device transmits the data report message to the management terminal by following manners. The second binding message further carries a second device identification of the management terminal and the cloud management platform adds the second device identification and the first device identification to a pre-created device binding relation.

In this embodiment, the second device identification of the management terminal is added into the second binding message. The cloud management platform extracts the second device identification and the first device identification according to the received second binding message. The second device identification corresponds to the management terminal and the first device identification corresponds to the NB-IoT device. A device binding relation list is created in the cloud management platform. The second device identification and the first device identification, corresponding to the second device identification, are added on the list. Therefore, the binding relation of the management terminal and the NB-IoT device is then created. A management terminal is generally corresponding to a plurality of NB-IoT devices being necessary to be managed.

In some embodiments, the method of this embodiment further includes: the NB-IoT device transmits a data report message to the cloud management platform, wherein the data report message carries target data and the first device identification; the cloud management platform determines the second device identification corresponding to the first device identification according to the device binding relation; and the cloud management platform transmits the data report message to the management terminal corresponding to the second device identification.

In this embodiment, the NB-IoT device locally generates the data report message carrying the target data and the first device identification. The cloud management platform extracts the first device identification to determine the NB-IoT device that transmits the data report message, after the data report message is received. The cloud management platform then searches in the local device binding relation list for the second device identification of the management terminal bound to the NB-IoT device. The cloud management platform transmits the data report message to the management terminal corresponding to the second device identification. The management terminal processes the received data report message and determines the following control operations.

It should be noted that, it is not necessary to create the corresponding relation of the second device identification and the first device identification in the cloud management platform. When the NB-IoT device transmits the data report message to the management terminal, the identification of the management terminal, having requirements of receiving the data report message, is added into the data report message.

Therefore, the cloud management platform is able to determine the management terminal having requirements of receiving the data report message, and transmits the data report message to the management terminal, according to the second device identification in the data report message.

Figure 2:
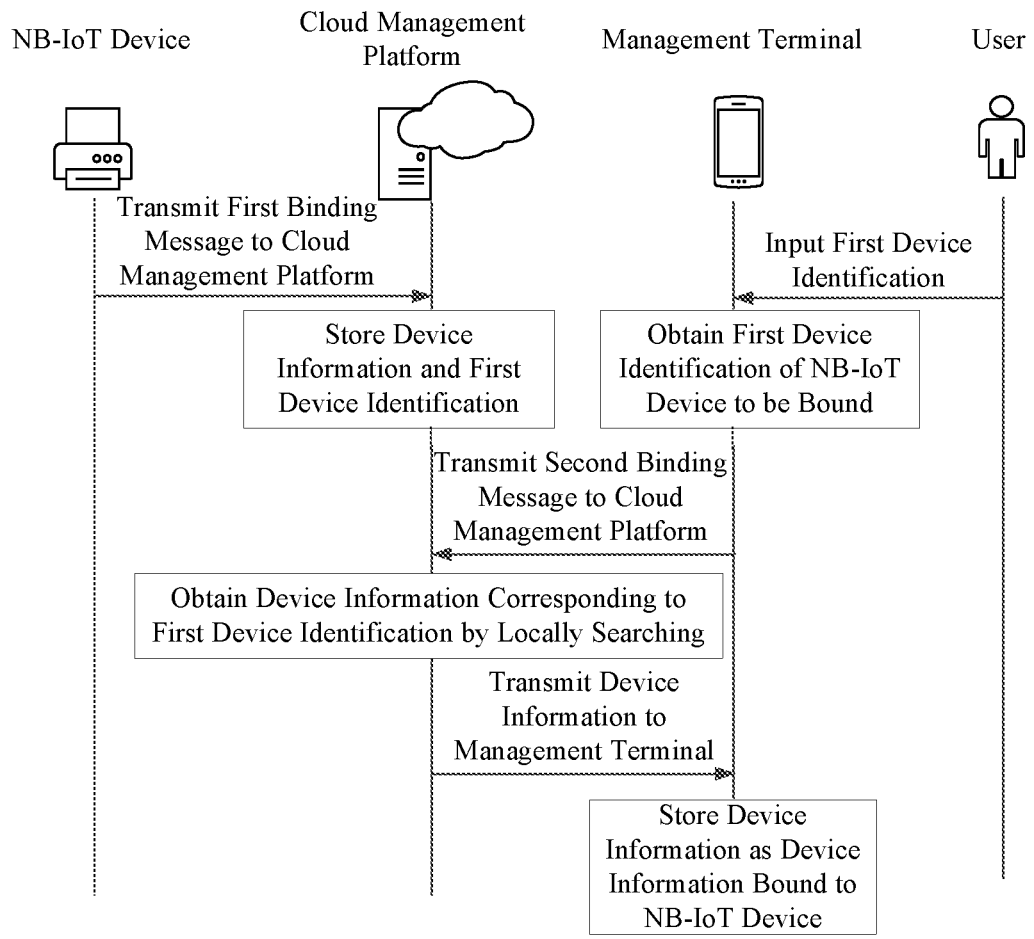
FIG. 2 is a schematic diagram of interactions in an Internet of Things control system in some embodiments of the present disclosure.

As such, as shown in FIG. 2, processes performed by the embodiments of the present disclosure include: the NB-IoT device transmits the first binding message to the cloud management platform upon detecting the detected first operation instruction; the cloud management platform stores the device information and the first device identification in a corresponding way; the management terminal obtains the first device identification, inputted by the user, of the NB-IoT device, upon detecting the second operation instruction, and the management terminal transmits the second binding message to the cloud management platform; the cloud management platform obtains the device information corresponding to the first device identification by locally searching according to the first device identification carried in the second binding message, and transmits the device information to the management terminal; and the management terminal stores the device information as device information bound to the NB-IoT device.

In the embodiments of the present disclosure, the NB-IoT device communicates with the management terminal through the cloud management platform. Therefore, the NB-IoT device is bound to the management terminal and the management terminal is able to manage the NB-IoT device.

Figure 3:
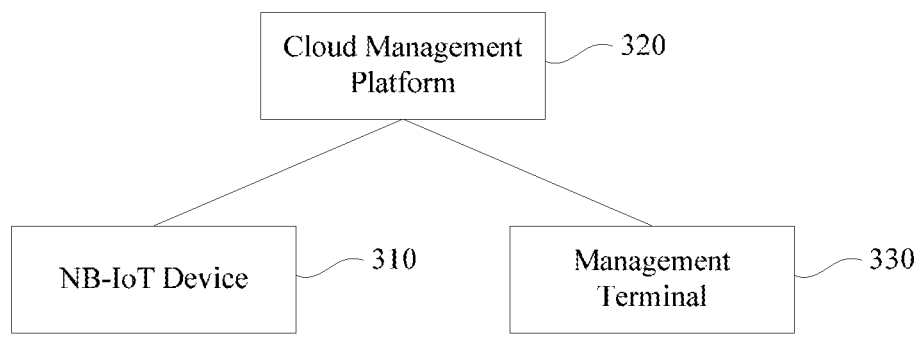
FIG. 3 is a block diagram of an Internet of Things control system in some embodiments of the present disclosure.

FIG. 3 is a block diagram of an Internet of Things control system in embodiments of the present disclosure. Referring to FIG. 3, the system includes an NB-IoT device 310, a cloud management platform 320 and a management terminal 330 of the core network.

The NB-IoT device 310 is configured to transmit, a first binding message to the cloud management platform 320 upon detecting a first operation instruction. The first binding message carries device information and a first device identification of the NB-IoT device 310.

The cloud management platform 320 is configured to store the device information and the first device identification in a corresponding way.

The management terminal 330 is configured to obtain the first device identification of the NB-IoT device 310 to be bound upon detecting a second operation instruction, and transmit a second binding message to the cloud management platform 320. The second binding message carries the first device identification.

The cloud management platform 320 is configured to obtain the device information corresponding to the first device identification by locally searching according to the first device identification, carried in the second binding message, and transmit the device information to the management terminal 330.

The management terminal 330 is configured to store the device information as device information bound to the NB-IoT device 310.

In some embodiments, the device information includes any one or more of the followings: a device type, a device name, and an operating parameter.

In some embodiments, the management terminal 330 is further configured to determine a control parameter according to the device information, and transmit a control request to the cloud management platform 320, wherein the control request carries the control parameter and the first device identification.

The cloud management platform 320 is further configured to transmit the control request to the NB-IoT device 310 corresponding to the first device identification.

In some embodiments, the second binding message further carries a second device identification of the management terminal 330.

The cloud management platform 320 is further configured to store the second device identification and the first device identification to a pre-established device binding relation.

In some embodiments, the NB-IoT device 310 is further configured to transmit a data report message to the cloud management platform 320. The data report message carries target data and the first device identification.

The cloud management platform 320 is further configured to determine, according to the device binding relation, the second device identification corresponding to the first device identification.

The cloud management platform 320 is further configured to transmit the data report message to the management terminal 330 corresponding to the second device identification.

In some embodiments, the management terminal 330 is configured to obtain the first device identification, inputted by a user, of the NB-IoT device 310 to be bound.

In this embodiment of the present disclosure, the NB-IoT device communicates with the management terminal through the cloud management platform. Therefore, the NB-IoT device is bound to the management terminal and the management terminal is able to manage the NB-IoT device.

It should be noted that the method for binding the NB-IoT device described above is implemented by the Internet of Things control system and will not be described herein again.

Figure 4:
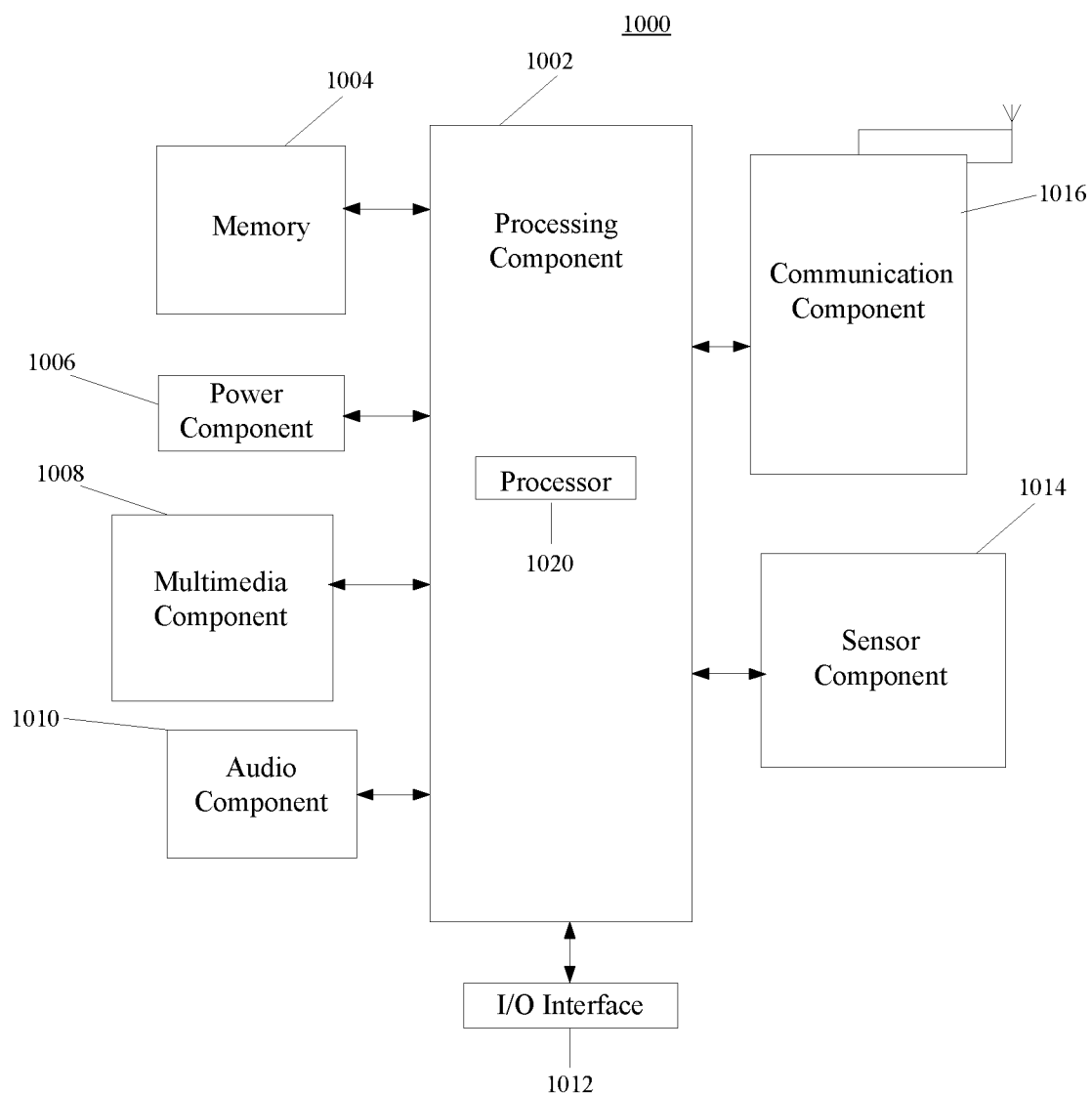
FIG. 4 is a block diagram of a terminal in some embodiments of the present disclosure.

FIG. 4 is a block diagram of a terminal in another exemplary embodiment of the present disclosure. The terminal is the management terminal in the above embodiments. Referring to FIG. 4, the terminal 1000 includes one or more of a processing component 1002, a memory 1004, a power component 1006, a multimedia component 1008, an audio component 1010, an input/output (I/O) interface 1012, a sensor component 1014, and a communication component 1016.

The processing component 1002 typically controls whole operations of the terminal 1000, such as the operations associated with displaying, telephone calls, data communications, camera operations, and recording operations. The processing component 1002 includes one or more processors 1020 to execute instructions for performing all or portions of the steps in the described methods. Moreover, the processing component 1002 includes one or more modules which facilitate the interactions between the processing component 1002 and other components. For instance, the processing component 1002 includes a multimedia module to facilitate the interactions between the multimedia component 1008 and the processing component 1002.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

The memory 1004 is configured to store various types of data for supporting the operations of the terminal 1000. Examples of the data include instructions for applications or methods operated on the terminal 1000, contact data, phonebook data, messages, pictures, and video stream, etc. The memory 1004 includes any type of volatile or non-volatile memory devices, or a combination thereof, e.g. a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk and an optical disk.

In exemplary embodiments, there is also provided a non-transitory computer-readable storage medium storing computer-readable instructions, such as stored in the memory 1004, the instructions when executed by the processor 1020 in the terminal 1000, performing the processes of the above-described methods. For example, the non-transitory computer-readable storage medium may be a ROM, an RAM, a CD-ROM, a magnetic tape, a floppy disc, an optical data storage device, and the like.

The communication component 1016 is configured to facilitate communication, in wired or wireless, between the terminal 1000 and other devices. The terminal 1000 accesses a wireless network with a communication standard, such as Wi-Fi, 2G, or 3G, or a combination thereof.

In one exemplary embodiment, the communication component 1016 receives a broadcast signal or broadcast related information from an external broadcast management system via a broadcast channel. In one exemplary embodiment, the communication component 1016 further includes a near field communication (NFC) module to facilitate short-range communications. For example, the NFC module utilize a radio frequency identification (RFID) technology, an infrared data association (IrDA) technology, an ultra-wideband (UWB) technology, a Bluetooth (BT) technology, and other technologies.

The power component 1006 provides power to different components of the terminal 1000. The power component 1006 includes a power management system, one or more power sources, and other components related to power generating, power management, and power distribution in the terminal 1000.

The multimedia component 1008 includes a display screen for providing an output interface which provides interactions between the terminal 1000 and the user. In some embodiments, the display screen includes a liquid crystal display (LCD) and a touch panel (TP). In some embodiments, organic light-emitting diode (OLED) or other types of displays can be employed. If the display screen includes the touch panel, the display screen works as a touch screen for receiving input signals caused by the operations made by the user. The touch panel includes one or more touch sensors to sense touches, swipes, and gestures applied on the touch panel. The touch sensors sense a boundary of a touch or swipe action, and a period of time and a pressure associated with the touch or swipe action.

In some embodiments, the multimedia component 1008 includes a front camera and/or a rear camera. The front camera and the rear camera receive an external multimedia data while the terminal 1000 is in an operation mode, e.g. a photographing mode or a video mode. Each of the front camera and the rear camera is a fixed optical lens system or has focusing and optical zoom capability.

The audio component 1010 is configured to output and/or input audio signals. For example, the audio component 1010 includes a microphone ("MIC"). The audio component 1010 is configured to receive an external audio signal when the terminal 1000 is in an operation mode, e.g. a call mode, a recording mode, and a voice recognition mode. The received audio signal is further stored in the memory 1004 or transmitted via the communication component 1016.

The I/O interface 1012 is an interface between the processing component 1002 and peripheral interface modules, e.g. a keyboard, a click wheel, buttons, etc. The buttons include a home button, a volume button, a starting button, and a locking button, but are not limited thereto.

The sensor component 1014 includes one or more sensors to provide status assessments of various aspects of the terminal 1000. For example, the sensor component 1014 detects turn-on/turn-off of the terminal 1000, positioning of components, e.g., the display and the keypad, of the terminal 1000. The sensor component 1014 further detects a position change of the terminal 1000 or a component of the terminal 1000, the contact status between the user and the terminal 1000, a position or moving speed (acceleration/deceleration) of the terminal 1000, and temperature variation of the terminal 1000.

The sensor component 1014 further includes a proximity sensor which is configured to detect the presence of nearby objects without any physical contact. The sensor component 1014 further includes a light sensor, such as a CMOS or CCD image sensor, for imaging applications. In some embodiments, the sensor component 1014 further includes an accelerometer sensor, a gyroscope sensor, a magnetic sensor, a pressure sensor, or a temperature sensor.

In exemplary embodiments, the terminal 1000 includes one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods.

In some embodiments of the first aspect of the present disclosure, the NB-IoT device communicates with the management terminal through the cloud management platform. Therefore, the NB-IoT device is bound to the management terminal, which allows the management terminal to manage the NB-IoT device.

In some embodiments, the device information includes any one or more of a device type, a device name, or an operating parameter.

In some embodiments, the method further includes determining, by the management terminal, a control parameter according to the device information, and transmitting, by the management terminal, a control request to the cloud management platform, wherein the control request carries the control parameter and the first device identification; and transmitting, by the cloud management platform, the control request to the NB-IoT device corresponding to the first device identification.

The management terminal controls the NB-IoT device through the above methods.

In some embodiments, the second binding message further carries a second device identification of the management terminal; and the cloud management platform stores the second device identification and the first device identification to a pre-established device binding relation.

In some embodiments, the method further includes transmitting, by the NB-IoT device, a data report message to the cloud management platform, wherein the data report message carries target data and the first device identification; determining, by the cloud management platform, the second device identification corresponding to the first device identification according to the device binding relation; and transmitting, by the cloud management platform, the data report message to the management terminal corresponding to the second device identification.

The NB-IoT device transmits the data report message to the management terminal through the above methods.

In some embodiments, the step of obtaining, by the management terminal, the first device identification of the NB-IoT device to be bound includes obtaining the first device identification, inputted by a user, of the NB-IoT device to be bound.

In some embodiments of the second aspect of the present disclosure, the device information includes any one or more of a device type, a device name, and an operating parameter.

In some embodiments, the management terminal is further configured to determine a control parameter according to the device information, and transmit a control request to the cloud management platform, wherein the control request carries the control parameter and the first device identification; the cloud management platform is further configured to transmit the control request to the NB-IoT device corresponding to the first device identification.

In some embodiments, the second binding message further carries a second device identification of the management terminal; the cloud management platform is further configured to store the second device identification and the first device identification to a pre-established device binding relation.

In some embodiments, the NB-IoT device is further configured to transmit a data report message to the cloud management platform, wherein the data report message carries target data and the first device identification; the cloud management platform is further configured to determine, according to the device binding relation, the second device identification corresponding to the first device identification; and the cloud management platform is further configured to transmit the data report message to the management terminal corresponding to the second device identification.

In some embodiments, the management terminal is configured to obtain the first device identification, inputted by a user, of the NB-IoT device to be bound.

Various embodiments of the present disclosure can have one or more of the following advantages.

The NB-IoT device communicates with the management terminal through the cloud management platform. Therefore, the NB-IoT device is bound to the management terminal, which allows the management terminal to manage the NB-IoT device.

One of ordinary skill in the art will understand that all or part of the steps of the above embodiments may be implemented by a hardware, or a related hardware instructed by programs. The programs may be stored in a computer readable storage medium, such as a non-transitory computer-readable storage medium. The storage medium mentioned may be a read-only memory, a magnetic disk or an optical disk or the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination The order of the various embodiments described above are only for the purpose of illustration, and do not represent preference of embodiments.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A method for binding a Narrow Band Internet of Things (NB-IoT) device, applied on an Internet of Things (IoT) control system having the NB-IoT device, a cloud management platform and a management terminal of a core network, comprising:
   transmitting, by the NB-IoT device, a first binding message to the cloud management platform upon detecting a first operation instruction, wherein the first binding message carries device information and a first device identification of the NB-IoT device;
   storing, by the cloud management platform, the device information and the first device identification;
   obtaining, by the management terminal, the first device identification of the NB-IoT device to be bound upon detecting a second operation instruction, and transmitting, by the management terminal, a second binding message to the cloud management platform, wherein the second binding information carries the first device identification;
   obtaining, by the cloud management platform, the device information corresponding to the first device identification by locally searching according to the first device identification carried in the second binding message, and transmitting, by the cloud management platform, the device information to the management terminal; and
   storing, by the management terminal, the device information as device information bound to the NB-IoT device.

2. The method of claim 1, wherein the device information comprises at least one of a device type, a device name, or an operating parameter.

3. The method of claim 1, further comprising:
   determining, by the management terminal, a control parameter according to the device information, and transmitting, by the management terminal, a control request to the cloud management platform, wherein the control request carries the control parameter and the first device identification; and
   transmitting, by the cloud management platform, the control request to the NB-IoT device corresponding to the first device identification.

4. The method of claim 1, wherein the second binding message further carries a second device identification of the management terminal;
   the method further comprising:
   storing, by the cloud management platform, the second device identification and the first device identification to a pre-established device binding relation.

5. The method of claim 4, further comprising:
   transmitting, by the NB-IoT device, a data report message to the cloud management platform, wherein the data report message carries target data and the first device identification;
   determining, by the cloud management platform, the second device identification corresponding to the first device identification according to the device binding relation; and
   transmitting, by the cloud management platform, the data report message to the management terminal corresponding to the second device identification.

6. The method of claim 1, wherein the obtaining, by the management terminal, the first device identification of the NB-IoT device to be bound comprises:
   obtaining the first device identification, inputted by a user, of the NB-IoT device to be bound.

7. An IoT system implementing the method according to claim 1, the IoT system comprising the Internet of Things control system, a plurality of NB-IoT devices, the cloud management platform, and the management terminal of the core network, wherein the cloud management platform is configured to enable the plurality of NB-IoT devices to communicate with the management terminal, thereby binding the NB-IoT devices to the management terminal and allowing the management terminal to manage the plurality of NB-IoT devices.

8. The IoT system according to claim 7, wherein the plurality of NB-IoT devices include a printer having a control parameter determined according to an operating parameter of the device information.

9. The IoT system according to claim 8, wherein the management terminal is configured to determine, based on a received operating parameter of low ink level of the printer, that the printer is in a low ink state.

10. The IoT system according to claim 9, wherein the management terminal is further configured to determine a control parameter of stop printing upon determining that the printer is in a printing state, thereby stopping printing work of the printer according to pre-defined determining rules.

11. The IoT system according to claim 10, wherein the management terminal is configured to transmit a control request carrying the control parameter of stop printing and a device identification "CNJ8F7F46S" of the printer to the cloud management platform, after the management terminal determines the control parameter of stop printing.

12. The IoT system according to claim 11, wherein the cloud management platform is configured to extract, after the control request is received, the device identification of the printer from the control request, made by the management terminal, to determine the bound printer that is in pending control state; and upon that the cloud management platform determines that the control request is for controlling the printer with the device identification, the control request is transmitted to the printer with the device identification.

13. The IoT system according to claim 7, wherein the management terminal is configured to manage the plurality of NB-IoT devices without a Wi-Fi environment.

14. An Internet of Things control system, comprising:
   an NB-IoT device, a cloud management platform and a management terminal of a core network;
   wherein the NB-IoT device is configured to transmit a first binding message to the cloud management platform upon detecting a first operation instruction, wherein the first binding message carries device information and a first device identification of the NB-IoT device;
   the cloud management platform configured to store the device information and the first device identification;
   the management terminal configured to obtain the first device identification of the NB-IoT device to be bound upon detecting a second operation instruction, and transmit a second binding message to the cloud management platform, wherein the second binding message carries the first device identification;

the cloud management platform configured to obtain the device information corresponding to the first device identification by locally searching according to the first device identification carried in the second binding message, and transmit the device information to the management terminal; and the management terminal configured to store the device information as device information bound to the NB-IoT device.

15. The system of claim 14, wherein the device information comprises at least one of a device type, a device name, or an operating parameter.

16. The system of claim 14, wherein the management terminal is further configured to determine a control parameter according to the device information, and transmit a control request to the cloud management platform, wherein the control request carries the control parameter and the first device identification; and the cloud management platform further configured to transmit the control request to the NB-IoT device corresponding to the first device identification.

17. The system of claim 14, wherein the second binding message further carries a second device identification of the management terminal;

the cloud management platform further configured to store the second device identification and the first device identification to a pre-established device binding relation.

18. The system of claim 17, wherein the NB-IoT device is further configured to transmit a data report message to the cloud management platform, wherein the data report message carries target data and the first device identification;

the cloud management platform further configured to determine, according to the device binding relation, the second device identification corresponding to the first device identification; and the cloud management platform further configured to transmit the data report message to the management terminal corresponding to the second device identification.

19. The system of claim 14, wherein the management terminal is configured to obtain the first device identification, inputted by a user, of the NB-IoT device to be bound.

* * * * *